(12) United States Patent
Hansen

(10) Patent No.: US 8,370,529 B1
(45) Date of Patent: Feb. 5, 2013

(54) TRUSTED ZONE PROTECTION

(76) Inventor: Robert Hansen, Austin, TX (US)

(*) Notice: Subject to any disclaimer, the term of this patent is extended or adjusted under 35 U.S.C. 154(b) by 0 days.

(21) Appl. No.: 13/545,961

(22) Filed: Jul. 10, 2012

(51) Int. Cl.
*G06F 15/16* (2006.01)
*G06F 15/173* (2006.01)
*G06F 9/00* (2006.01)
*G06F 11/00* (2006.01)

(52) U.S. Cl. ............ 709/249; 709/223; 726/11; 726/22
(58) Field of Classification Search .................. None
See application file for complete search history.

(56) References Cited

U.S. PATENT DOCUMENTS

| | | | | |
|---|---|---|---|---|
| 6,954,790 | B2* | 10/2005 | Forslow | 709/227 |
| 7,206,934 | B2* | 4/2007 | Pabla et al. | 713/168 |
| 7,657,597 | B2* | 2/2010 | Arora et al. | 709/206 |
| 7,778,260 | B2* | 8/2010 | Sturniolo et al. | 370/401 |
| 7,933,260 | B2* | 4/2011 | Chaturvedi et al. | 370/352 |
| 8,204,992 | B2* | 6/2012 | Arora et al. | 709/226 |
| 2002/0069278 | A1* | 6/2002 | Forslow | 709/225 |
| 2004/0064512 | A1* | 4/2004 | Arora et al. | 709/206 |
| 2004/0064568 | A1* | 4/2004 | Arora et al. | 709/228 |
| 2004/0064693 | A1* | 4/2004 | Pabla et al. | 713/168 |
| 2005/0246767 | A1* | 11/2005 | Fazal et al. | 726/11 |
| 2006/0009213 | A1* | 1/2006 | Sturniolo et al. | 455/426.1 |
| 2006/0039365 | A1* | 2/2006 | Ravikumar et al. | 370/352 |
| 2006/0048196 | A1* | 3/2006 | Yau | 725/81 |
| 2007/0150951 | A1* | 6/2007 | Aaron et al. | 726/22 |
| 2007/0250627 | A1* | 10/2007 | May et al. | 709/225 |
| 2009/0187983 | A1* | 7/2009 | Zerfos et al. | 726/10 |
| 2010/0017870 | A1* | 1/2010 | Kargupta | 726/14 |
| 2011/0185286 | A1* | 7/2011 | Moyers et al. | 715/752 |
| 2012/0155646 | A1* | 6/2012 | Seshadri et al. | 380/279 |

\* cited by examiner

*Primary Examiner* — Ranodhi Serrao
(74) *Attorney, Agent, or Firm* — Mark R. Hennings

(57) ABSTRACT

A trusted zone protector in exemplary embodiments of an electronic system helps reduce unwanted attempts to use a consumer machine in a trusted zone to address a network resource that lies inside the trusted zone on behalf of a website that lies outside of the trusted zone. An address manager in the electronic system is arranged to provide an indication whether an element retrieved by a network-enabled application executing on the consumer machine is arranged to address a network resource that lies inside the trusted zone. The trusted zone protector is arranged to generate a protective action in response to the indication that the element retrieved by the network-enabled application is arranged to address the network resource that lies inside the trusted zone.

19 Claims, 6 Drawing Sheets

TRUSTED ZONE PROTECTION

BACKGROUND

Network-enabled applications are applications that use communication networks to share information between various devices, each of which might be operated by the same or different user. The network-enabled applications include applications such as browser engines, messaging interfaces, e-mail tools, remote desktops, and the like that allow users to easily browse, select, and manipulate items being viewed using a network-enabled application. The network-enabled application receives one or more communications (such as code for instantiating webpages) from a service provider that is often encoded in the form of a language (such as the hypertext markup language HTML), which describes the structure and functionality of the content that is received by the content user.

The network resources upon which the network-enabled applications execute are often arranged in a private network that is arranged as a trusted zone. The private network is typically addressed using Internet protocol (IP) addresses in accordance with an established Internet protocol. The addresses of each network resource within the private network are typically provided to each of the network resources in the private network. The trusted zone is typically shielded from the public Internet by a firewall and thus various devices within the trusted zone communicate across the public Internet by using network address translation, port address translation, and/or a proxy server.

However, malicious code that might be present in the network-enabled application (and/or computer upon which the network-enabled application is executing) can be used to induce unauthorized commands to be sent. In a cross-site request forgery exploit for example, the trust of the user in the user's network-enabled application is exploited. The cross-site request forgery (often referred to as CSRF, XSRF, a one-click attack, "confused-deputy problem," and/or session riding) exploit operates by inducing the browser by way of HTML or script to (usually unknowingly) access a website for which a user has ready accessed (such as being logged in, having an authentication cookie set, an established session identifier, and the like).

The malicious function can be accessed by the user's browser rendering a seemingly valid element (such an image tag) that has a reference to a location that is typically inaccessible by the attacker. When the reference location is visited by the user's browser, the user's browser then executes the malicious function. The malicious function can be used to transmit a request to perform an action on behalf of the user using the user's own machine. (The performed action can include malicious activity such as transferring funds from the user's bank account to an attacker's bank account.) Thus, attackers can exploit the trust established by a requested site by way of the user's machine having been forced to by the referring site to perform the exploit.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . . " Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

The term "domain" as used herein refers to either a domain or a portion of the domain ("subdomain") if any. Thus, the term "subdomain" can be used to refer to a portion of the "domain." A subdomain can be, for example, a domain name server (DNS) record. For example, the name "www.example.com" can be used in a localized context to refer to a domain (notwithstanding the fact that "www.example.com" is itself a subdomain of "example.com"). While net-enabled applications such as browsers follow a "same origin" policy and tend to use the longer version "www.example.com" as a domain name, the net-enabled applications also use the shorter version "example.com" for certain purposes (such as for cookies that are set with the domain switch). Thus all subdomains of the domain "example.com" include "no-subdomains" (such as "http://example.com/" and "http://whatever.example.com/") and include the more-specific subdomains (such as www.example.com). The term "render" can be used to describe a change rendered in the logical structure of a Document Object Model (DOM) as well as a graphical rendering of the DOM element.

Figure 1:
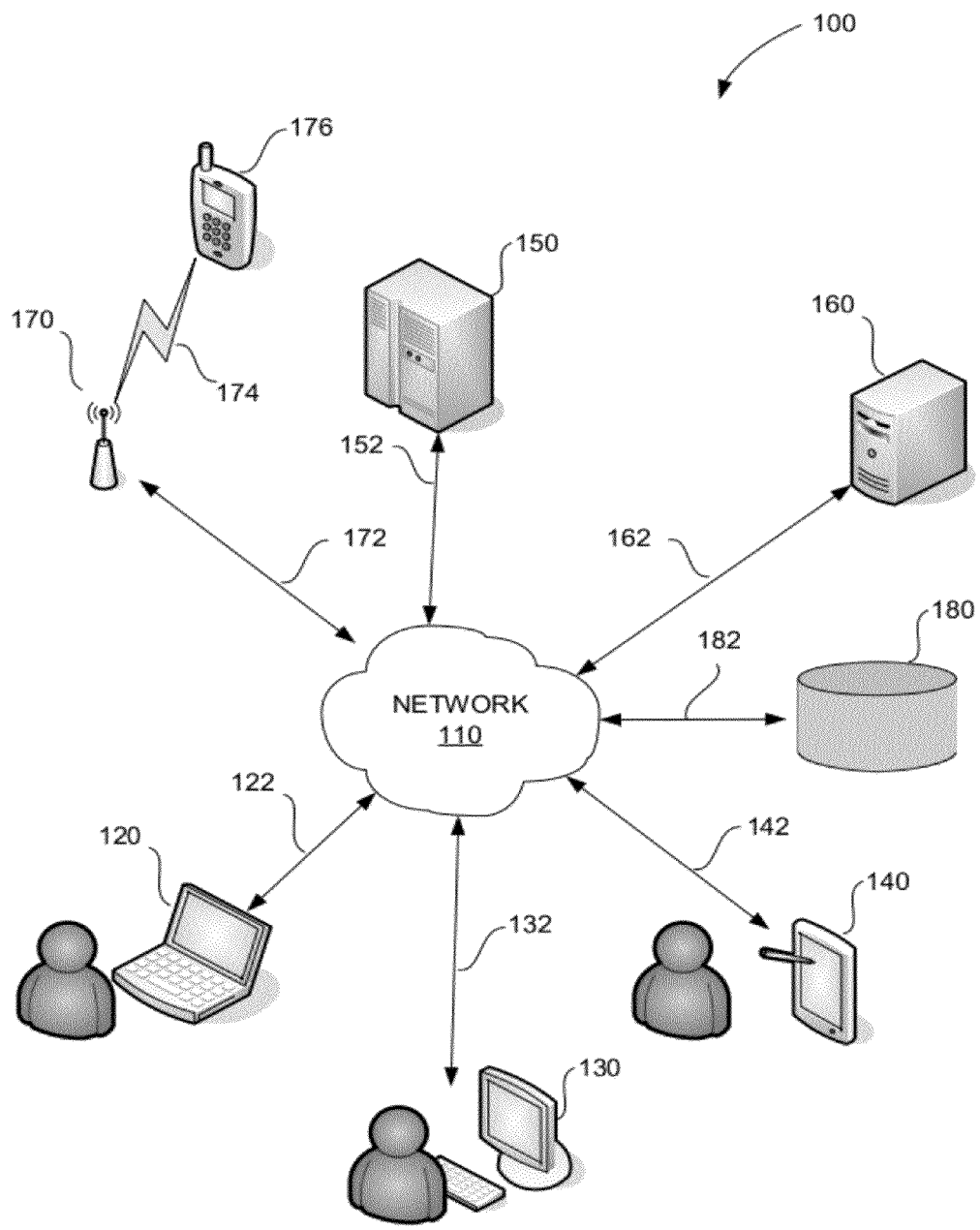
FIG. 1 is a network diagram illustrating a network that is suitable for practicing aspects of trusted zone protection in accordance with exemplary embodiments of the disclosure.

FIG. 1 is a network diagram illustrating a network that is suitable for practicing aspects of trusted zone protection in accordance with exemplary embodiments of the disclosure. Network system 100 includes consumer 120, 130, and 140 (machines, for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the Internet, but other networks (including private networks) can be used. Thus, network 110 is typically a collection of networks (and gateways) that typically use a TCP/IP suite of protocols for packet-based communications. The Internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked service providers of services such as service provider 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
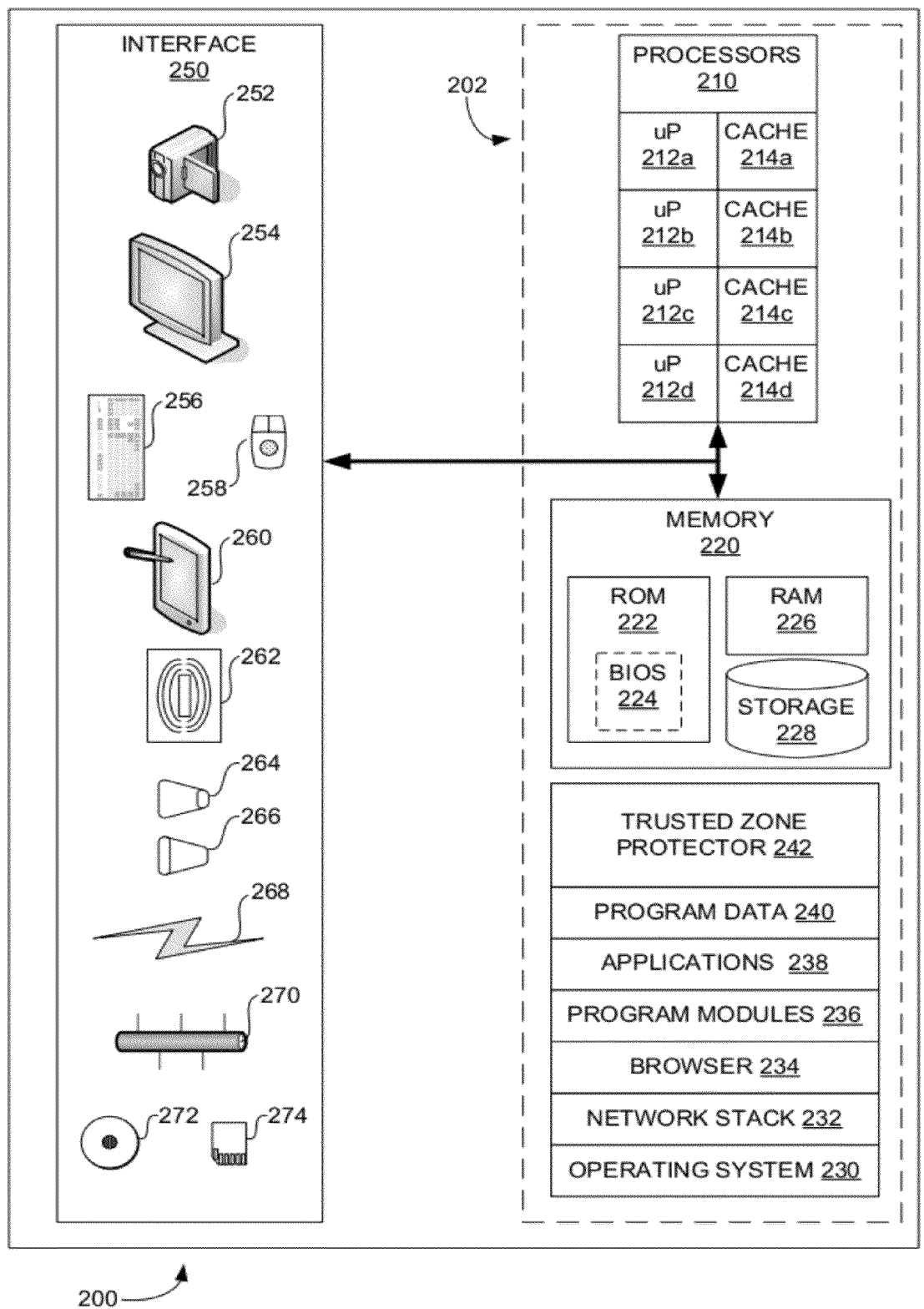
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212*a*, 212*b*, 212*c*, and 212*d*, each of which is optionally coupled to a respective, local cache 214*a*, 214*b*, 214*c*, and 214*d*. Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based drivers for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and trusted zone protector 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the trusted zone protector 242, for example.

Figure 3:
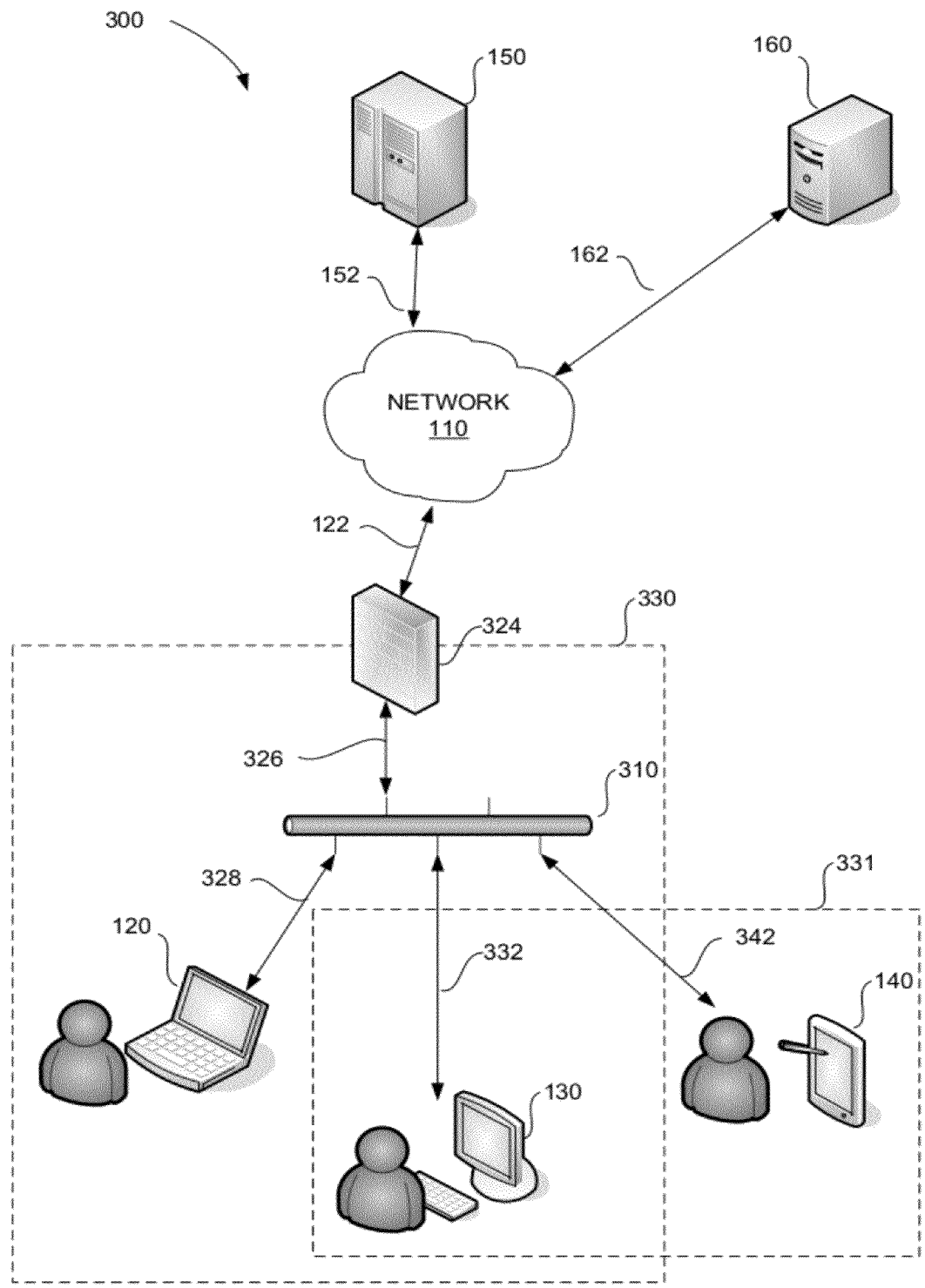
FIG. 3 is a network diagram illustrating in conjunction with FIG. 2 a network that includes trusted zone protection in accordance with exemplary embodiments of the disclosure.

FIG. 3 is a network diagram illustrating in conjunction with FIG. 2 a network that includes trusted zone protection in accordance with exemplary embodiments of the disclosure. Network system 300 includes service provider 150 and third party resource provider 160, as discussed above. Service provider 150 is arranged to provide networked content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160 (which is also a networked services provider).

Service provider 150 is a server (or a set of servers that are presented as a single server or a "virtual" server for processing requests). The consumers 120, 130, and 140 are typically clients with respect to the server (e.g., service provider 150). The consumers 120 and 130 are networked resources such as, for example, personal computers that are networked together in a trusted zone 330. A trusted zone is an exemplary group of network resources (e.g., "machines") that have trusted communications amongst the network resources of a first trusted zone (such as trusted zone 330) associated with the network-enabled application. The network resources inside the first trusted zone have untrusted communications between a network resource of the first trusted zone and a network resource outside of the first selected trusted zone. For example, communications amongst network resources of the first selected trusted zone can be considered to be "trusted," and communications between a network resource of the first selected trusted zone and a network resource outside of the first selected trusted zone can be considered to be "untrusted." Thus, exploits (if any) on a machine of a second selected trusted zone (such as consumer 140 of trusted zone 331, wherein the machine is not also included in the first selected trusted zone) do not have a level of "trusted" access to all machines included in the first selected trusted zone (such as consumer 120 in trusted zone 330).

Trusted zone 330 is protected against attacks from networked resources (such as third party resource provider 160) by firewall 324, which processes communications from the consumers 120, 130, and 140 across the network 110 by providing network address or port address translation, and/or by providing proxy services. Trusted zone 330 can include a network 310 that provides a link 326 for communicating with the firewall 324, a link 328 for communicating with consumer 120, a link 332 for communicating with consumer 130, and a link 342 for communicating with consumer 140. For example, the consumers 120, 130, and 140 are arranged as trusted network resources that are networked together in a trusted zone using a firewall 324 or authentication such that the network resources are otherwise inaccessible to an external attack. The trusted zone can include network resources from within a private address space (that includes consumers 120, 130, and 140, for example) as well as network resources that lie outside of the private address space. Thus, the trusted zone can include network resources from a virtual private network where network resources are securely accessed over a public or private network. In a similar manner, a second trusted zone 331 can be arranged having, for example, consumers 120 and 130 in the trusted zone, but excluding consumer 140 from the trusted zone (the second trusted zone can also have additional machines that are not members of the first trusted zone).

The trusted zone protector 242 is arranged to determine whether an element retrieved by an Internet-enabled application is arranged to address a network resource that lies inside the trusted zone 330. As further described below (e.g., with reference to FIG. 4), the determination can be made before a document object model (DOM) containing the element is rendered, can be made during the rendering (including updating) of the DOM, and can be made in response a request being initiated to address the network resource that lies inside the trusted zone. Accordingly, the trusted zone protector 242 can, for example, detect when an attacker attempts to use a loaded element (on a "hacked machine," for example) to access another network resource that trusts the hacked machine. Thus, the attack that is arranged to address a network resource that lies inside the trusted zone is detected so that appropriate protective actions can be taken (for example) before any potential harm from the attack can occur.

The trusted zone protector 242 is variously arranged to initiate taking a protective action such as sending warning signals and/or blocking the attempts by the rendered element to address a network of another network resource that lies within the trusted zone. The warning signal can be a warning signal that is used for internal (triggering) purposes and/or for purposes of conveying a warning to a related entity such as networked service provider, user, administrator, security event logger, and the like (and combinations thereof) that conveys the existence (and optionally attributes) of the malicious element. The concerned entity can include a networked service provider of the content that includes the rendered element, a user of the networked-enabled application that retrieved the rendered element, an administrator of the computer (and/or network) on which the network-application is executing. The attempts by the rendered element to address a network of another network resource that lies within the same private local area network can be selectively blocked by blocking (including logging, denying, delaying, and the like) the attempts in response to a command by a user, an administrator, a third-party security services provider, and the like that are warned of the malicious element by the warning signal.

Figure 4:
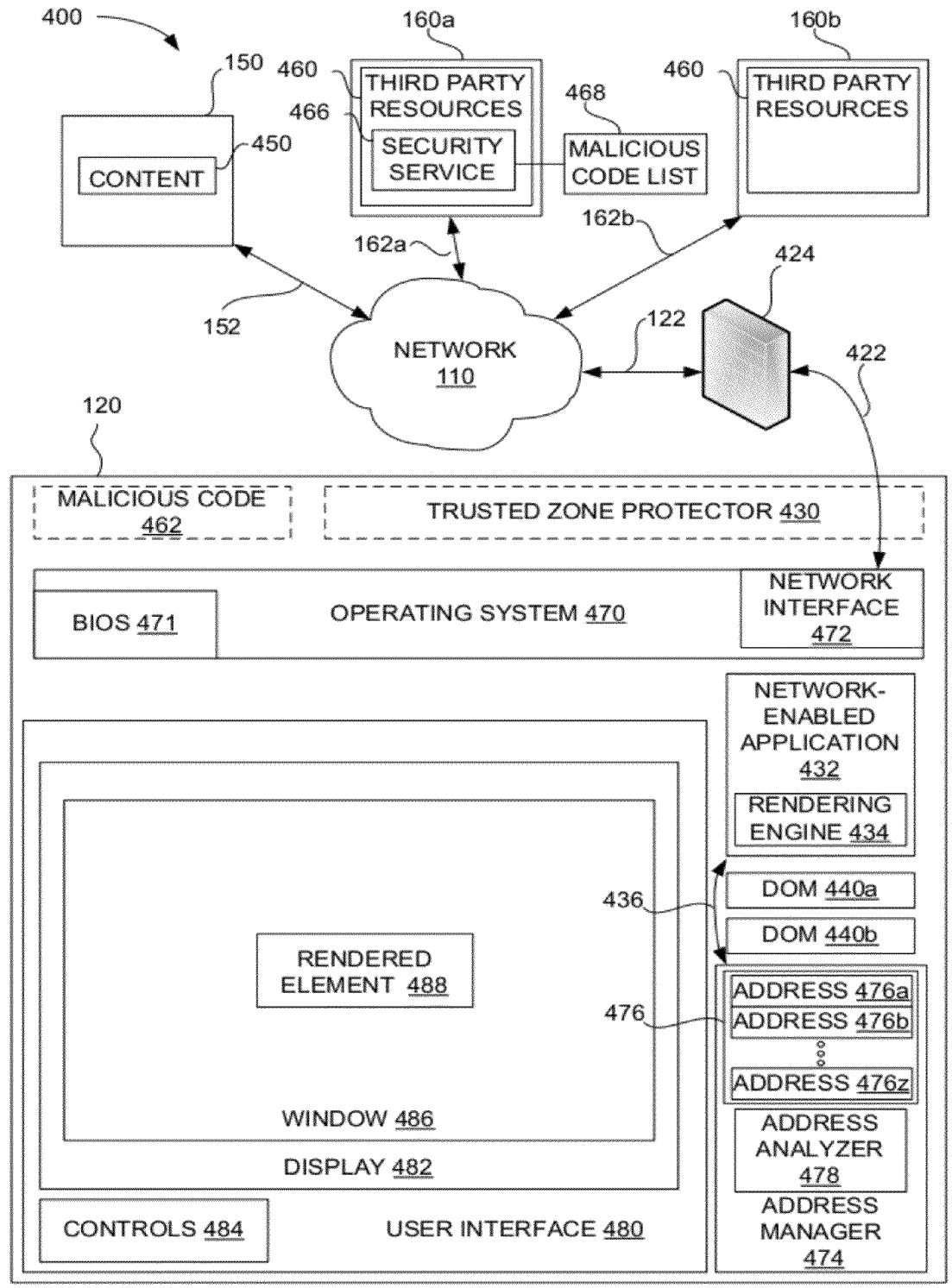
FIG. 4 is a logic diagram illustrating an trusted zone protector in accordance with exemplary embodiments of the disclosure.

FIG. 4 is a logic diagram illustrating a trusted zone protector in accordance with exemplary embodiments of the disclosure. Network system 400 includes, for example: consumer 120, service provider 150, and third party resource providers 160a and 160b. Consumer 120 is arranged to (e.g., securely) communicate with network 110 using communication links 122, firewall 424, and communication link 422. Third party resource providers 160a and 160b are arranged to communicate with network 110 using communication links 162a and 162b respectively.

Consumer 120 typically includes a network-enabled application 432 that is arranged to conduct communications between service provider 150 and consumer 120. For example, network-enabled application 432 includes a (purported) standards-compliant browser such as Chrome, Firefox, Internet Explorer, and the like. A user performs an action such as following a bookmark, or clicking on a local link, opening a Word or PDF document, entering a URL (universal resource locator) or IP (Internet protocol) address, or selecting a displayed control to select content 450 (or a portion thereof) hosted by service provider 150, and the like. The selection is relayed by the browser via the network 110 to the addressed service provider (e.g., service provider 150) having the selected content.

Service provider 150 responds by sending a communication to the consumer 120. The communication is received by the network interface 472 of operating system 470 and the communication is passed to the network-enabled application 432 for decoding and rendering, for example, using a window 486 in the display 482.

The communication is often a webpage written in a markup language, although other formats can be used such as style sheets, JavaScript reference, and the like. The webpage often contains elements that address content provided by the service provider 150 as well as content provided by one or more third party resource providers 160 (such as third party resource providers 160a or 160b). The references in the received communication are, for example, instantiated using a DOM (document object model) 440 as the network-enabled application 432 parses the received communication in accordance with the format used to encode the information encoded in the received communication. The DOM 440 can be arranged as a parent DOM that is associated with one or more children DOMs, wherein each of the DOMs can be associated with a trusted-zone network resource that is indicated by the received communication. (The parent DOM is not included in the list 476 described below so that the consumer 120 hosting the network-enabled application 432 can render elements that address local resources.)

As the network-enabled application 432 parses the received communication, the network-enabled application 432 constructs a DOM 440 (such as DOMs 440a and 440b) that delineates the structure and the function of the encoded information. The DOM 440 is arranged to render both content of requested third party resources (such as third party resources 460a or 460b) and local references on the same website, for example. The rendered content can be used to manage a window 486 of a webpage (conveyed by the encoded information) for display in the display 482 (typically via BIOS 471 of the operating system 470). The display 482 is used to provide visual indications to a user and to prompt the user for input. The user input is captured using controls 484 (such as by a keyboard and/or a mouse) of the user interface 480.

Window 486 is a (e.g., computer program) application window that is arranged to display program output and to help capture user input. Window 486 is, for example, a window of a network-enabled application 432 and is associated with a rendered element 488 that is arranged to be selected by a user using controls 484. The rendered element 488 is included in the received communication by the service provider 150 as a, for example, malicious element that is rendered by rendering engine 434 in accordance with DOM 440*a*, for example.

Cross-domain elements allow Internet-enabled applications to reference domains that are outside of the parent domain in which the window 486 was originated. Examples of cross-domain elements include advertising banners, "like" buttons, "digg" buttons, and the like, each of which initiates a cross-site reference that references the domain that is outside of a parent domain of the webpage in which the cross-domain elements are included. Malicious elements can contain cross-site references that can reference cross-domain sites that are within a trusted zone.

Many, if not most, externally inaccessible sites behind a firewall do not protect themselves from direct exploits or CSRF. The externally inaccessible sites are typically not protected from direct exploits or CSRF as they are perceived by many to be inaccessible by attackers and therefore are at a lower risk level to such attacks.

The trusted zone protector 430 (which is a trusted zone protector such as trusted zone protector 242) prevents (and/or reduces) attackers from forcing a request with a malicious element that is arranged to initiate requests between network resources in the trusted zone on behalf of the attacker. The network addresses of network resources in the trusted zone are maintained by the address manager 474. The address manager 474 is arranged to maintain a list 476 of addresses (such as addresses 476*a*, 476*b*, through 476*z*) wherein each address in list 476 is compared with an address that is associated with a network resource in the trusted zone. One or more lists 476 that are associated respectively with one or more trusted zones can be selected such that a particular consumer 120 can be associated with one or more selected trusted zones. (The one or more lists 476 can be internally or externally maintained and/or originated and as well as remotely consulted and/or downloaded.)

The address analyzer 478 is arranged to compare addresses generated (including addresses potentially generated) in response to an element delivered by the network-enabled application 432. In one example, the address analyzer 478 can examine the DOM 440*a* to provide an indication whether any element of the DOM 440*a* is arranged to initiate requests with any network resources implicated by any of the addresses in list 476. In another example, the address analyzer 478 can provide an indication whether the address generated during the rendering of DOM 440*a* is an intranet (or otherwise sensitive location that may be publically accessible but protected by authentication that the attacker doesn't have) request. In yet another example, the address analyzer 478 can analyze an initiated request to determine whether any requested network resources network resources are implicated (e.g., pointed to) by any of the addresses in list 476. In a further example, the address analyzer can analyze elements before and/or during the rendering of the DOM 440 to determine whether any requested network resources network resources (as arranged to be addressed by the analyzed elements) are implicated by any of the addresses in list 476.

The generated addresses are compared by the address analyzer 478 with the addresses in the list 476 of addresses. When the generated address falls within the list 476, the address analyzer, for example, instructs the network-enabled application via signal bus 436 to block and/or convey a warning concerning the communications associated with the malicious element from which the generated address was rendered by rendering engine 434 or predicted by address analyzer 478.

List 476 can be a blacklist of network resources supplied by a user (including a network administrator) and/or in combination with an automated script arranged to provide an indication of which network resources exist (and/or are available) within the trusted zone that are not to be made accessible (and/or addressable) to a network resource that lies outside of the trusted zone. (In various exemplary embodiments, a blacklist can be derived by logically manipulating the contents of a whitelist.) The network resources can be specified and/or identified by a combination of names and/or addresses such as IP (Internet protocol), top-level domain-name, domain-name, hostname, or subdomain-name addresses. (The IP addresses can be specified at a block level, such as using classless inter-domain routing blocks, and notation such as "192.168.0-255" and the like.) Accordingly, the determination of whether an element delivered by the Internet-enabled application is arranged to address a network resource that is specified by the list 476 can be made in response to a translation of addressable hostnames to associated IP addresses and domain names (by the rendering engine 434 and/or the address analyzer 478, for example).

The rendered element 488 (containing a cross-site request forgery exploit) can also be obscured using techniques such as making rendered element 488 small or otherwise invisible and/or by rendering the rendered element 488 in a partially off-browser window. The rendered element 488 is often a cross-domain element that can be encoded as an element (of varying kinds) so that the rendered element 488 can attempt to induce the network-enabled application 432 to communicate with other network resources in the trusted zone that are otherwise protected by, for example, the firewall 424 and/or site authentication.

To help prevent (and/or reduce) CSRF exploitation of network resources in the trusted zone by malicious code within rendered element 488, the trusted zone protector 430 (which is a trusted zone protector such as trusted zone protector 242 as described above) takes a protective action such as preventing a transaction from being initiated using any malicious code within rendered element 488. The protective action can also include generating a warning signal that is used, for example, to reduce and/or prevent CSRF exploits by warning a user or the administrator of the malicious request.

The trusted zone protector 430 uses the warning signal to, for example, notify the user and/or administrator that an element delivered by an Internet-enabled application is arranged to address a network resource that lies inside the trusted zone. The trusted zone protector 430 can, for example, display the link referenced by the rendered element and query the user for permission to proceed before proceeding with the transaction implicated by the rendered element.

The trusted zone protector 430 can also use the warning signal to inform a security service 466 (such as hosted by a third party resource provider 160) that an element delivered by an Internet-enabled application is attempting to address a network resource that lies inside the trusted zone. The warning signal can include attributes of the implicated element, the URL of the parent DOM, cookies, referring URL, and other forensic attributes such that the security service 466 can examine attributes of the implicated element (including the website from which the implicated element was loaded) against a malicious code list 468 of known dangerous sites (and/or code) before allowing the transaction initiated by the implicated element to proceed. The security service 466 can probe the websites surrounding the website from which the rendered element was loaded to determine the safety of the surrounding websites (for example, when the attributes of the rendered element do not yet appear in the malicious code list 468).

The trusted zone protector 430 can also use the warning signal to block proceeding with any transaction initiated by the implicated element. Automatically blocking a request from initiating any communication associated with the rendered element provides a higher degree of confidence that an unwanted action would occur as a result of rendering (without hindrance) a potentially malicious element.

In an example, the trusted zone protector 430 can analyze any element that is a cross-site element (such as by using address analyzer 478 to provide an indication whether the received communication contains any elements that address any of the addresses in list 476). If any of the analyzed elements are arranged to address a network resource that lies inside a trusted zone, a warning signal is generated and the action initiated by the rendered element can be blocked as described above.

Network-enabled applications (such as browser engines, messaging interfaces, e-mail tools, remote desktops, and the like) can access the trusted zone protector 430 by adding to and/or replacing functionality often provided by the operating system 470. The network-enabled applications can operate (at least to a degree) independently of the operating system 470 (such as by rendering a webpage loaded from an external network resource). Accordingly, a browser application can operate in conjunction with (and/or incorporate features of) the trusted zone protector 430. For example, the trusted zone protector 430 can display the warning signal in the window 486 itself, or as a URL (universal resource link) signal, a DNS (domain name server) signal, or an HTTP (hypertext transfer protocol) header, or HTML (hypertext markup language) tag. Also, a modal dialog (that is similar to, e.g., an alert dialog) that pops up (or is otherwise brought into view) above the window itself can be used to display the warning signal and related forensic attributes as discussed above. An audible warning signal can also be generated.

Thus, the network-enabled application can use the warning signal to take an action (such as by blocking the transaction associated with the rendered element associated with the warning signal) without necessarily relying upon the operating system 470 to specifically provide the functionality to specifically taking action in response to the warning signal (such as by blocking the transaction associated with the rendered element).

Figure 5:
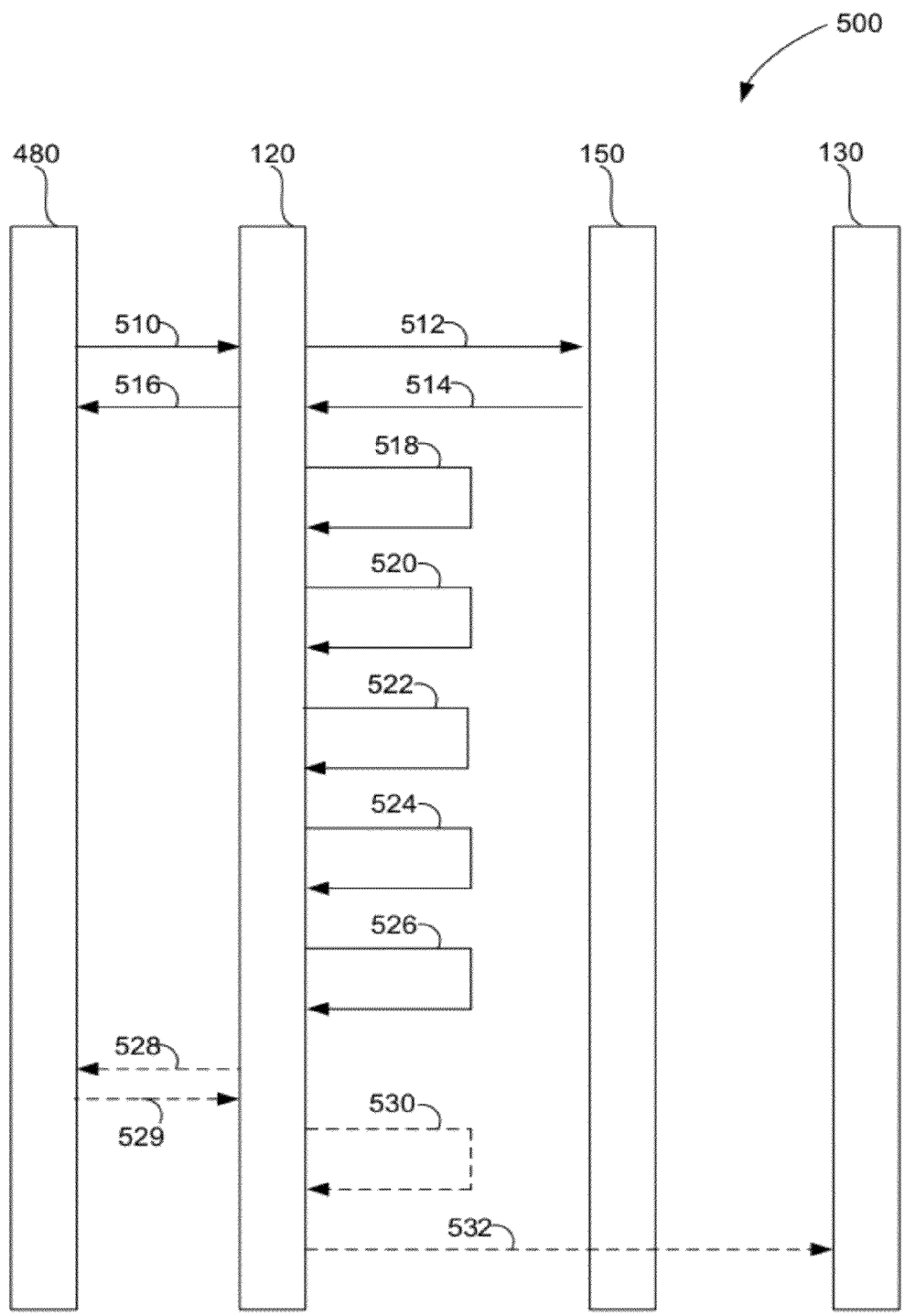
FIG. 5 is a signaling diagram illustrating in conjunction with FIG. 4 trusted zone protection in accordance with exemplary embodiments of the disclosure.

FIG. 5 is a signaling diagram illustrating in conjunction with FIG. 4 trusted zone protection in accordance with exemplary embodiments of the disclosure. Signaling diagram 500 illustrates communications transmitted and received between and amongst the user interface 480, for example, consumer 120, service provider 150, and consumer 130. A user at user interface 480 sends a command 510 to consumer 120 for generating a request 512 for content (or other services) from service provider 150. In response, service provider 150 transmits a communication 514 via an external network wherein the communication 514 includes an element (such as rendered element 488) that has a reference to a location that is typically inaccessible by the attacker that when visited executes a malicious function.

When the communication 514 is received and parsed (for example), consumer 120 renders (for example) a DOM 440 that determines the structure and function of window 486. The DOM 440 (which typically includes elements that are also graphically rendered) is rendered and the results of the graphical rendering are sent via communication 516 to user interface 480 for display in window 486. Window 486 includes, for example, a rendered element 488 that is arranged to initiate a network transaction. However, the rendered element 488 can include malicious code 462 (such as a trusted zone attack that uses a machine inside of a trusted zone to access another machine inside the trusted zone on behalf of a website outside of the trusted zone). The malicious code 462 can attempt to exploit the trust established by a requested network resource (such as consumer 130) by way of the user's machine (such as consumer 120) having been forced to by the referring site (such as service provider 150) to perform the exploit.

As the DOM 440 is rendered, the malicious code can also be examined. For example, a communication 518 can be generated to request that an element being rendered is to be examined to determine whether the element is arranged, for example, to attempt to send a request. In response to the communication 518 being generated, the trusted zone protector 430 is notified in operation 520 of the potential attempt to send a request. The trusted zoned protector 430 can provide an indication whether the referring website lies outside of a trusted zone (such as a trusted zone defined by an address list 476) and whether the element attempting to access a requested network resource that lies within the trusted zone.

To determine whether the referring website lies outside of a trusted zone (and the requested network resource lies within the trusted zone), for example, the trusted zone protector 430 notifies (in operation 522) the address manager 474 of the address of the referring website and the address of the requested network resource.

Address manager 474 analyzes the addresses to determine whether the supplied addresses lie within (and/or excluded from) one or more trusted zones. In operation 524, the address manager 474 provides an indication to the trusted zone protector 430 whether suspicious behavior (such as website outside of the trusted zone attempting to use a machine inside of a trusted zone to access another machine inside the trusted zone) is implicated by the supplied addresses (which is thus potentially malicious code 462). In an exemplary embodiment, the context of a website inside of the trusted zone attempting to use a machine inside of a trusted zone to access another machine inside the trusted zone is not necessarily considered suspicious. Likewise, the context of website inside of the trusted zone attempting to use a machine outside of a trusted zone to access another machine outside the trusted zone is not necessarily considered suspicious.

In operation 526, the network-enabled application 432 is notified (at least) that the element is engaged in suspicious behavior. In various exemplary embodiments, relevant forensic information can be passed to the network-enabled application 432. In response to the notification, the network-enabled application takes protective action(s) such as selectively notifying (as notified in communication 528) and/or querying the user (as notified in communication 528 and polled in communication 529) and/or blocking the suspicious request. Accordingly, when malicious code 462, for example, on consumer 120 tries to signal the network-enabled application 432 in operation 530 to use a machine inside of a trusted zone to access another machine inside the trusted zone on behalf of a website outside of the trusted zone, the network-enabled application 432 selectively blocks the attempted operation 532 of contacting the consumer 130. Thus, the malicious code 462 is unable to use a machine inside of a trusted zone to access another machine inside the trusted zone on behalf of a website outside of the trusted zone.

Figure 6:
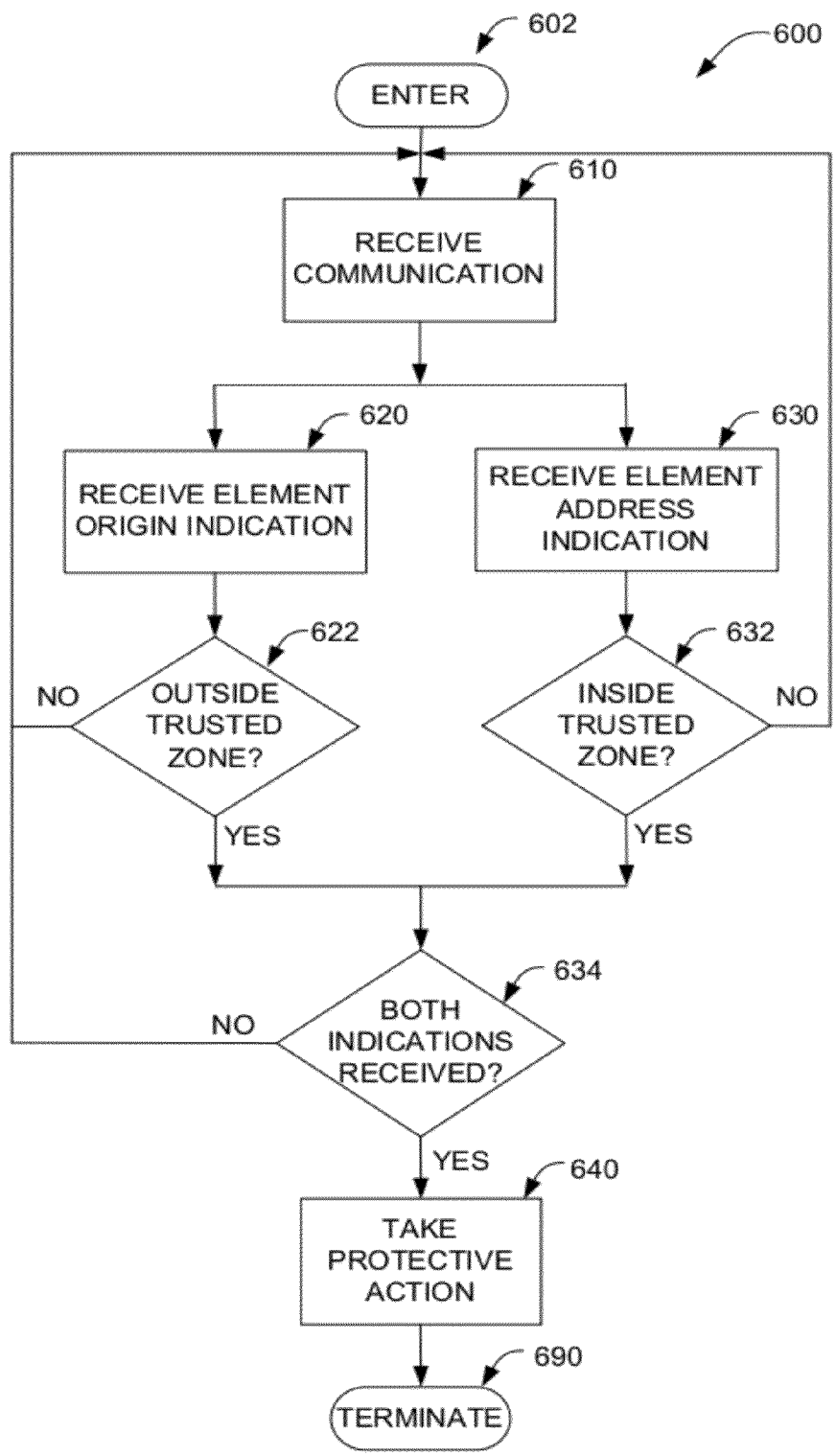
FIG. 6 is a flow diagram illustrating trusted zone protection in accordance with exemplary embodiments of the disclosure.

FIG. 6 is a flow diagram illustrating trusted zone protection in accordance with exemplary embodiments of the disclosure. The program flow illustrated herein is exemplary, and thus various operations (and various portions of the operations) within the program flow can be performed concurrently and/or in an order that is not necessarily the same as the program flow illustrated herein (including, for example, using logical substitutions and reordering made in accordance with DeMorgan's theorems and Boolean algebra). Program flow 600 begins at node 602 and proceeds to operation 610.

In operation 610, a network-enabled application is used to receive a communication that includes an element. Program flow forks with a first fork proceeding to operation 620 and a second fork proceeding to operation 630.

In operation 620, an element origin indication that indicates whether an element is received by a network-enabled application from a network resource that lies outside a trusted zone is received. Program flow proceeds to operation 622.

In operation 622, the element origin indication is evaluated. If the element origin indication provides a positive indication of whether the element is received by a network-enabled application from a network resource that lies outside a trusted zone, program flow proceeds to operation 634 (to potentially join with the second fork). If the element origin indication provides a negative indication of whether the element is received by a network-enabled application from a network resource that lies outside a trusted zone, program flow proceeds to operation 610.

In operation 630, an element address indication that indicates whether the element is arranged to address a network resource that lies inside the trusted zone is received. Program flow proceeds to operation 632.

In operation 632, the element address indication is evaluated. If the element address indication provides a positive indication of whether the element is arranged to address a network resource that lies inside the trusted zone, program flow proceeds to operation 634 (to potentially join the first fork of the program flow). If the element address indication provides a negative indication of whether the element is arranged to address a network resource that lies inside the trusted zone, program flow proceeds to operation 610.

In operation 634, the condition of whether both the element origin indication and the element address indication have been received is evaluated. If both the element origin indication and the element address indication have been received, program flow proceeds to operation 640. If either the element origin indication or the element address indication has not been received (for a received communication, for example), program flow proceeds to operation 610.

In operation 640, a protective action is taken in response to the element origin indication and the element address indication. Program flow proceeds to node 690 and terminates.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method, comprising:
receiving, at a device, an element origin indication that indicates whether an element is received by a network-enabled application from a network resource that lies outside a trusted zone;
receiving an element address indication that indicates whether the element is arranged to address a network resource that lies inside the trusted zone;
taking a protective action in response to the element origin indication and the element address indication;
wherein the trusted zone of network resources includes a group of network resources having trusted communications amongst the network resources of a first selected trusted zone associated with the network-enabled application and having untrusted communications between a network resource of the first selected trusted zone and a network resource outside of the first selected trusted zone associated with the network-enabled application;
wherein the element address indication is generated by comparing the address by which the element is arranged to address a network resource against addresses included in a list of network resources in the trusted zone;
networking the group of trusted network resources together via a network that is otherwise inaccessible to an attacker because of the presence of one or more firewalls or authentication requirements;
wherein the element address indication is generated in response to rendering the element received by the network-enabled application; and
wherein the element address indication is generated in response to an initiation of a request to the network resource that lies inside the trusted zone.

2. The method of claim 1, wherein the list of network resources in the trusted zone includes a blacklist of network resources.

3. The method of claim 2, wherein the blacklist of network resources includes network addresses of network resources that are securely accessed over a public network.

4. The method of claim 3, comprising specifying the addresses of the network resources that are included in the trusted zone as IP (Internet protocol) addresses, as IP address lists, as a top-level domain-name, domain-name, hostname, or subdomain-name addresses, as a hash of IP (Internet protocol) addresses, as a hash of IP address lists, or as a hash of top-level domain-name, domain-name, hostname, or subdomain-name addresses.

5. The method claim 4, comprising translating addressable hostnames to associated IP addresses and domain names.

6. The method of claim 4, comprising generating a warning signal that is internal to the network resource that lies inside the trusted zone and upon which the network-enabled application is executing.

7. The method of claim 6, wherein the taken protective action includes generating a warning signal that is conveyed to an entity related to the network-enabled application.

8. The method of claim 6, wherein the taken protective action includes blocking a request to the network resource referred to by the network-enabled application in response to the warning signal.

9. The method of claim 8, comprising loading the element received by the network-enabled application from an external network resource as part of a webpage, wherein the element is associated with an internal address of a network resource that lies inside the trusted zone and that is otherwise inaccessible by the external network resource.

10. The method of claim 9, wherein a parent document object model (DOM) of the webpage that the network-enabled application renders is not included in the blacklist of network resources.

11. A non-transitory computer-readable storage medium including instructions that, when executed on a processor of an electronic system, comprise:
receiving an element origin indication that indicates whether an element is received by a network-enabled application from a network resource that lies outside a trusted zone;

receiving an element address indication that indicates whether the element is arranged to address a network resource that lies inside the trusted zone;

taking a protective action in response to the element origin indication and the element address indication;

wherein the trusted zone of network resources includes a group of network resources having trusted communications amongst the network resources of a first selected trusted zone associated with the network-enabled application and having untrusted communications between a network resource of the first selected trusted zone and a network resource outside of the first selected trusted zone associated with the network-enabled application;

wherein the element address indication is generated by comparing the address by which the element is arranged to address a network resource against addresses included in a list of network resources in the trusted zone;

networking the group of trusted network resources together via a network that is otherwise inaccessible to an attacker because of the presence of one or more firewalls or authentication requirements;

wherein the element address indication is generated in response to rendering the element received by the network-enabled application; and wherein the element address indication is generated in response to an initiation of a request to the network resource that lies inside the trusted zone.

12. A web browsing system, comprising:

a consumer machine including a network-enabled application that is arranged to receive a communication from a networked service provider that describes the structure and functionality of content of the communication that is received by the content user;

an address manager that is arranged to generate an indication whether an element retrieved by a network-enabled application from a network resource outside of a trusted zone of network resources is arranged to address a network resource that lies inside the trusted zone;

a trusted zone protector that is arranged to generate a protective action in response to the indication that the element loaded by the network-enabled application is arranged to address the network resource that lies inside the trusted zone;

wherein the trusted zone of network resources includes a group of network resources having trusted communications amongst the network resources of a first selected trusted zone associated with the network-enabled application and having untrusted communications between a network resource of the first selected trusted zone and a network resource outside of the first selected trusted zone associated with the network-enabled application;

wherein the element address indication is generated by comparing the address by which the element is arranged to address a network resource against addresses included in a list of network resources in the trusted zone;

wherein the trusted zone includes a group of trusted network resources that are networked together via a network that is otherwise inaccessible to an attacker because of the presence of one or more firewalls or authentication requirements;

wherein the indication whether the element retrieved by the network-enabled application is arranged to reference the network resource that lies inside the trusted zone is made by rendering the element retrieved by the network-enabled application; and wherein the element address indication is generated in response to an initiation of a request to the network resource that lies inside the trusted zone.

13. The system of claim 12, wherein the address manager is arranged to generate an indication whether the element is arranged to address a network resource that lies inside the trusted zone.

14. The system of claim 12, wherein the indication whether the element retrieved by the network-enabled application is arranged to reference the network resource that lies inside the trusted zone is made by analyzing the element retrieved by the network-enabled application.

15. The system of claim 12, wherein the indication that the element retrieved by the network-enabled application is arranged to address the network resource that lies inside the trusted zone is made in response to an request initiated by a rendered element to address a network resource that lies inside the trusted zone on behalf of a website that lies outside of the trusted zone.

16. The system of claim 12, wherein the address manager includes a first list of addresses of network resources in a first selected trusted zone.

17. The system of claim 16, wherein the address manager includes a second list of addresses of network resources in a second selected trusted zone.

18. The system of claim 16, wherein the first list of addresses of network resources in the first selected trusted zone includes addresses that are securely accessed over a public network.

19. The system of claim 12, wherein the protective action taken includes blocking a request to the network resource referred to by the network-enabled application.

* * * * *